(12) United States Patent
Ferrari et al.

(10) Patent No.: US 12,515,942 B2
(45) Date of Patent: Jan. 6, 2026

(54) MEMS DEVICE COMPRISING AN INSULATED SUSPENDED DIAPHRAGM, IN PARTICULAR PRESSURE SENSOR, AND MANUFACTURING PROCESS THEREOF

(71) Applicant: STMICROELECTRONICS S.r.l., Agrate Brianza (IT)

(72) Inventors: Paolo Ferrari, Gallarate (IT); Flavio Francesco Villa, Milan (IT); Enri Duqi, Milan (IT); Igor Varisco, Settimo Milanese (IT); Filippo D'Ercoli, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 557 days.

(21) Appl. No.: 17/843,483

(22) Filed: Jun. 17, 2022

(65) Prior Publication Data

US 2022/0411256 A1    Dec. 29, 2022

(30) Foreign Application Priority Data

Jun. 25, 2021 (IT) .......................... 102021000016766

(51) Int. Cl.
   *B81B 3/00*      (2006.01)
   *G01L 9/00*      (2006.01)
   *H10D 62/10*     (2025.01)

(52) U.S. Cl.
   CPC .......... *B81B 3/0021* (2013.01); *G01L 9/0042* (2013.01); *G01L 9/0073* (2013.01);
   (Continued)

(58) Field of Classification Search
   CPC ... G01L 9/0042; G01L 9/0073; G01L 9/0045; G01L 9/12; G01L 9/0047
   See application file for complete search history.

(56) References Cited

U.S. PATENT DOCUMENTS

| | | | |
|---|---|---|---|
| 5,883,420 A | 3/1999 | Mirza et al. | |
| 5,888,845 A * | 3/1999 | Bashir ................. | H04R 31/003 257/E21.026 |

(Continued)

FOREIGN PATENT DOCUMENTS

| | | |
|---|---|---|
| CN | 102285632 A | 12/2011 |
| CN | 107117577 A | 9/2017 |

(Continued)

OTHER PUBLICATIONS

Sato et al., "A New Substrate Engineering for the Formation of Empty Space in Silicon (EES) Induced by Silicon Surface Migration," IEDM: 517-520, 1999, 4 pages.

*Primary Examiner* — Britt D Hanley
*Assistant Examiner* — Jason James Greaving
(74) *Attorney, Agent, or Firm* — Seed IP Law Group LLP

(57) ABSTRACT

MEMS device formed in a semiconductor body which is monolithic and has a first and a second main surface. A buried cavity extends into the semiconductor body below and at a distance from the first main surface. A diaphragm extends between the buried cavity and the first main surface of the semiconductor body and has a buried face facing the buried cavity. A diaphragm insulating layer extends on the buried face of the diaphragm and a lateral insulating region extends into the semiconductor body along a closed line, between the first main surface and the diaphragm insulating layer, above the buried cavity. The lateral insulating region laterally delimits the diaphragm and forms, with the diaphragm insulating layer, a diaphragm insulating region which delimits the diaphragm and electrically insulates it from the rest of the wafer.

20 Claims, 6 Drawing Sheets

(52) U.S. Cl.
CPC .... *H10D 62/115* (2025.01); *B81B 2201/0264* (2013.01); *B81B 2203/0127* (2013.01)

(56) References Cited

U.S. PATENT DOCUMENTS

| | | | |
|---|---|---|---|
| 7,678,600 | B2 | 3/2010 | Villa et al. |
| 9,783,411 | B1* | 10/2017 | Potasek ............... B81C 1/00269 |
| 2008/0224242 | A1* | 9/2008 | Villa ................... B81C 1/00158 |
| | | | 257/419 |
| 2011/0308324 | A1* | 12/2011 | Gamage ................ G01L 9/0054 |
| | | | 29/25.35 |
| 2013/0062713 | A1 | 3/2013 | Sakuragi et al. |
| 2017/0247249 | A1* | 8/2017 | Duqi ..................... B81B 7/0061 |
| 2018/0108675 | A1 | 4/2018 | Schmidt et al. |
| 2021/0403315 | A1* | 12/2021 | Artmann ................. B81B 3/007 |

FOREIGN PATENT DOCUMENTS

| | | | |
|---|---|---|---|
| CN | 108692836 | A | 10/2018 |
| CN | 109721022 | A | 5/2019 |
| EP | 1324382 | A1 | 7/2003 |
| EP | 1577656 | A1 | 9/2005 |
| EP | 1719993 | A1 | 11/2006 |

\* cited by examiner

MEMS DEVICE COMPRISING AN INSULATED SUSPENDED DIAPHRAGM, IN PARTICULAR PRESSURE SENSOR, AND MANUFACTURING PROCESS THEREOF

BACKGROUND

Technical Field

The present disclosure relates to a MEMS device comprising an insulated suspended diaphragm, in particular a pressure sensor, and manufacturing process thereof.

DESCRIPTION OF THE RELATED ART

As is known, more and more applications use integrated semiconductor sensors manufactured using micromachining techniques and based on the detection of the deformation of a thin membrane or diaphragm, suspended above a cavity (so-called MEMS sensors). For example, absolute or differential, capacitive or piezoresistive pressure sensors, inertial sensors, chemical sensors, magnetic-field sensors, and microphones may be made using these techniques.

MEMS sensors, by virtue of their advantageous characteristics as to high sensitivity, low power consumption and thermal stability, are finding increasingly wide application in the medical, aerospace, automotive, industrial and commercial fields.

Often these sensors have an electrical, and possibly thermal, insulation of the diaphragm with respect to the semiconductor substrate from which the diaphragm is formed.

U.S. Pat. No. 7,678,600 B2 describes for example a process for manufacturing a monocrystalline silicon diaphragm suspended above a buried cavity and entirely contained in a semiconductor body. This process is extremely simple and economical; furthermore it is compatible with the integrated manufacturing of electronic circuits and components intended to process the signals generated by a sensor formed in, or on, the diaphragm. Furthermore, the resulting structure has small dimensions.

FIG. 1 shows, for example, a capacitive pressure sensor obtainable with the process described in U.S. Pat. No. 7,678,600 B2.

As is noted, the known pressure sensor (indicated as a whole by 10), is formed in a body 1 comprising a substrate 2 and an epitaxial layer 3 and accommodating a buried cavity 12. The buried cavity 12 extends between the substrate 2 and the epitaxial layer 3, at a distance from a front face 1A of the body 1, and delimits, with the front face 1A, a surface region forming a diaphragm 14. In practice, the diaphragm 14 is formed in the epitaxial layer 3.

An insulating structure 16 completely surrounds the diaphragm 14 and electrically insulates it from the rest of the body 1. The insulating structure 16 comprises a buried insulating region 17 and a lateral insulating region 18.

The buried insulating region 17 is formed by a silicon oxide layer having a first portion 17A which completely surrounds the buried cavity 12 and a second portion 17B which extends further adjacent to the buried cavity 12, between the substrate 2 and the epitaxial layer 3.

The lateral insulating region 18 is also formed by a silicon oxide layer and extends from the front face 1A of the body 1 to the second portion 17B of the buried insulating region 17.

The lateral insulating region 18 generally has an internal cavity 8 and the buried insulating region 17 generally has empty zones 9 in the second portion 17B.

A thin passivation layer 4 and/or thick oxide regions 5 may extend on the surface 1A of the body 1.

A first metal contact 20 is arranged above the diaphragm 14, for example at a central portion thereof, and electrically contacts it. A second metal contact 21 is arranged on the back of the body 1 and electrically contacts the substrate 2. In practice, the substrate 2 forms a bottom electrode and the diaphragm 14 forms a top electrode of the pressure sensor 10.

The pressure sensor 10 is formed from an initial wafer, of monocrystalline silicon (forming approximately the substrate 2), which is selectively etched using a mask and carrying out an anisotropic etching to form a first group of deep trenches where it is desired to form the diaphragm 14 (diaphragm area) and a second group of deep trenches in an external area, surrounding the diaphragm area. In particular, the trenches of the first group are arranged at a short distance from each other and are separated by silicon columns or pillars, while the trenches of the second group are spaced apart from each other by wider silicon columns.

Subsequently, an epitaxial layer is grown on the initial wafer in a deoxidizing environment. The epitaxial layer (corresponding to the epitaxial layer 3) closes the trenches of both groups at the top and these begin to change shape, enlarging laterally.

A thermal annealing step is then performed which causes a migration of silicon atoms, which tend to move to a lower surface energy position. In particular, in the diaphragm area, due to the proximity of the trenches and to the reduced width of the columns dividing them, the trenches join to form the buried cavity 12, while, in the external area, channels having substantially circular section are formed, at a mutual distance.

Subsequently the wafer is etched from the front to form a connection trench extending from the front surface to the channels in the external area. The trench typically has a closed shape, for example rectangular, and is used to inject oxygen to the channels and cavity.

The injected oxygen causes oxidation of the silicon surrounding the channels and the cavity, giving rise to a silicon oxide layer on the sides of the buried cavity 12 and forming the buried insulating region 17. Furthermore, part of the epitaxial layer 3 around the connection trench forms the lateral insulating region 18.

The oxidation process generally does not cause any closing of the connection trench, whose remaining central zone forms the internal cavity 8; furthermore, the oxidation may not completely eliminate the channels and therefore give rise to empty zones 9.

The internal cavity 8 may therefore be at least partially closed by depositing insulating material, such as TEOS (plug regions 19).

Further steps then follow for forming the thin passivation layer 4, the thick oxide regions 5, any other conductive regions, and the metal contacts 20, 21.

This process, while being advantageous and allowing to form a diaphragm 14 completely and electrically insulated from the rest of the wafer 1, in some cases may give rise to a buried insulating region 17 that is not continuous (interruptions in the second portion 17B of the buried insulating region 17) or having a too small thickness in the areas between the empty zones 9.

In this case, the diaphragm 14 might not be sufficiently electrically insulated from the substrate 2, compromising the correct operation of the pressure sensor 10, whose two electrodes (formed by the substrate 2 and the diaphragm 14, as indicated) would be short-circuited.

BRIEF SUMMARY

At least in one embodiment, a MEMS device of the present disclosure comprises: a semiconductor body, the body being monolithic and having a first and a second main surface; a buried cavity in the semiconductor body; a diaphragm extending between the buried cavity and the first main surface of the semiconductor body, the diaphragm having a buried face facing the buried cavity; a diaphragm insulating layer extending on the buried face of the diaphragm; and a lateral insulating region, comprising insulating material, extending into the semiconductor body along a closed line, between the first main surface and the diaphragm insulating layer, above the buried cavity, the lateral insulating region laterally delimiting the diaphragm and being in contact with the diaphragm insulating layer.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein.

DETAILED DESCRIPTION

Embodiments of a process for manufacturing an insulated suspended diaphragm of semiconductor material are now described; this process is based, in part, on the processes described in the aforementioned patent application EP-A-1 577 656, and in patent applications EP-A-1 324 382 and U.S. Pat. No. 7,678,600, also in the name of the same Applicant.

Figure 1:
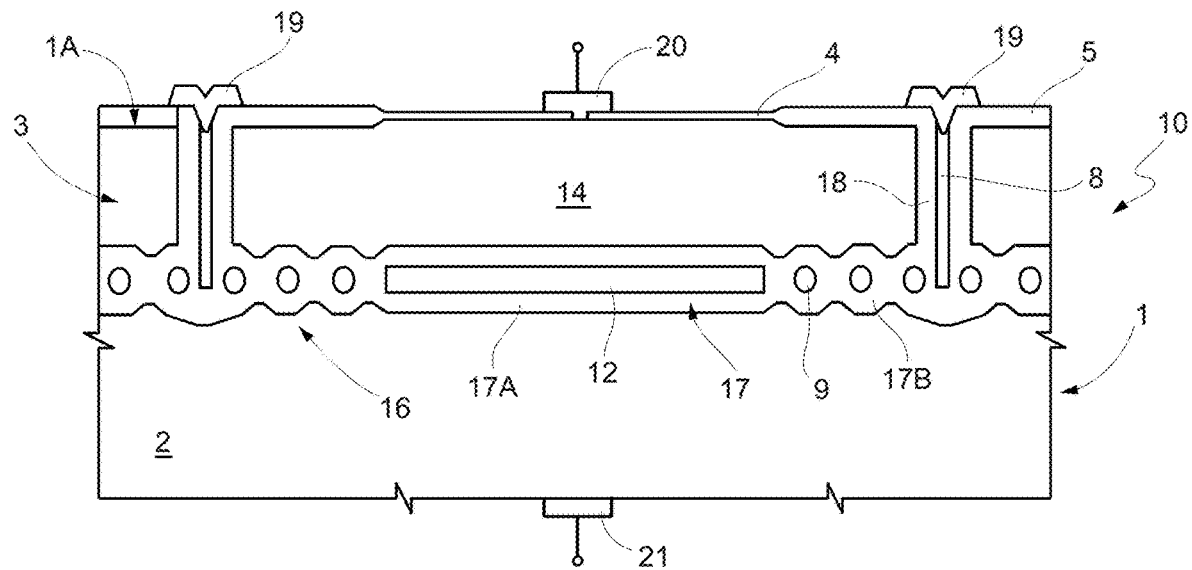
FIG. 1 is a cross-section of a known pressure sensor.
Figure 2:
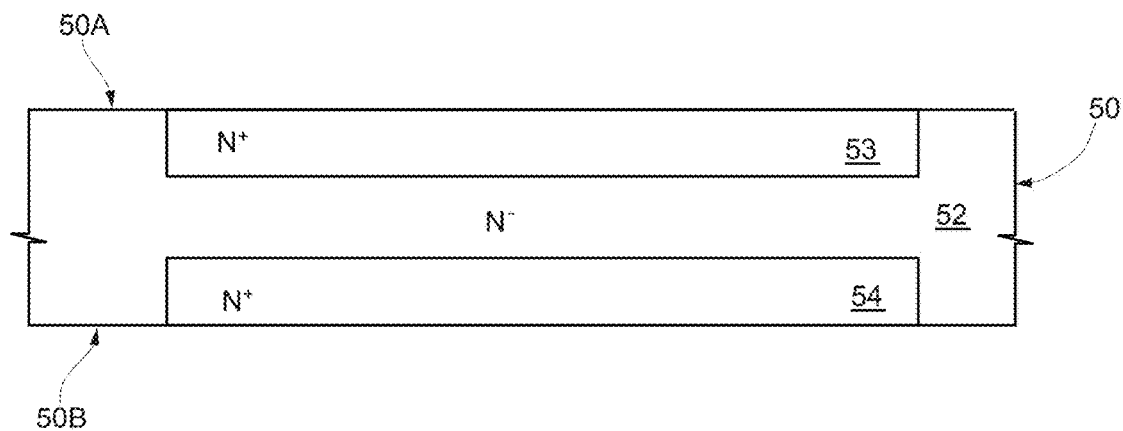
FIG. 2 is a cross-section of semiconductor a wafer in a processing step for manufacturing a MEMS device having a buried cavity.

FIG. 2 (not to scale, as well as the subsequent Figures) shows a wafer 50 of semiconductor material, for example monocrystalline silicon, comprising a substrate 52 having N-type doping. The substrate 52 has a top surface 50A and a bottom surface 50B.

The wafer 50 is processed to form a first and a second doped region 53, 54, respectively, at the top surface 50A and bottom surface 50B, respectively. The first and the second doped regions 53, 54 may be formed by ion implantation of doping species, such as phosphorus P or arsenic As, or by deposition, for example from $POCl_3$ and therefore have $N^+$ doping. The first and second doped regions 53, 54 may be referred to as first and second conductive regions.

Then, FIGS. 3-6, 7A and 7B, a buried cavity 58 is formed in the first doped region 53. For this purpose, the process object of patent application EP-A-1 577 656 and briefly described hereinbelow is used.

Figure 3:
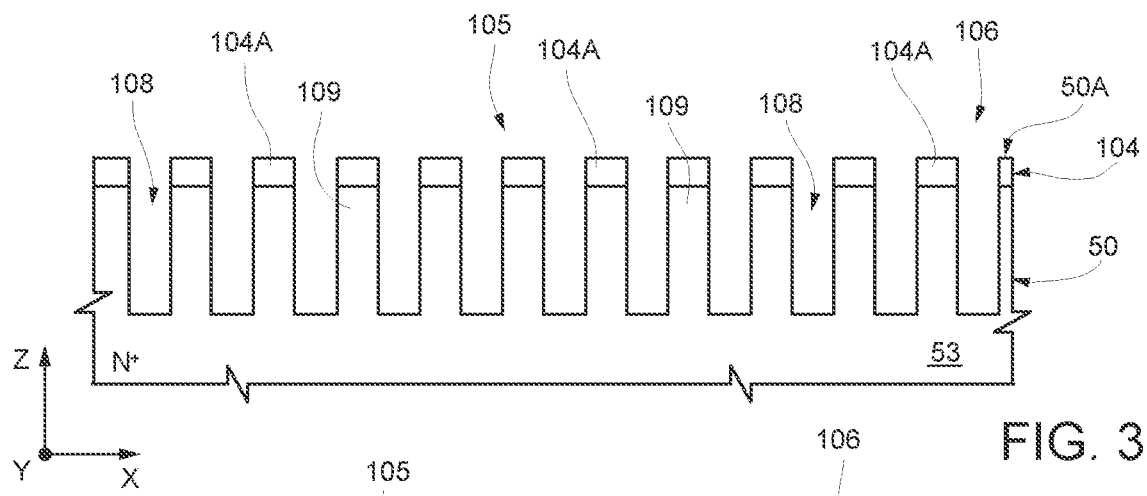
FIGS. 3-5 are cross-section views of a portion of the wafer of FIG. 2, on an enlarged scale, in subsequent manufacturing steps.

In particular, FIG. 3, showing only a portion of the first doped region 53, a resist layer is deposited on the first surface 50A of the wafer 50 and is defined to form a mask 104.

Again with reference to FIG. 3, the mask 104 comprises a plurality of mask portions 104A having a generically polygonal shape (for example square or hexagonal), arranged regularly in rows and columns and together defining a lattice-shaped zone. In particular, in this embodiment and as explained below with reference to FIG. 6, the mask portions 104A are arranged to form a diaphragm area 105, having a rectangular or square envelope (in a plane parallel to a plane XY of a Cartesian reference system XYZ), and a connection area 106, having an elongated envelope projecting from one side of the diaphragm area 104, along a first direction Y of the Cartesian reference system XYZ.

The mask portions 104A are arranged at a short mutual separation distance. For example, the separation distance between the mask portions 104A may be comprised between 0.5 and 1 μm.

The wafer 50 is front-etched through an anisotropic etching, using the mask 104. Deep trenches 108 are thus formed. The deep trenches 108 have for example a depth of 10 μm and delimit columns (or "pillars") 109, of silicon, having an area (in the plane XY) corresponding to the shape of the mask portions 104A.

Figure 4:
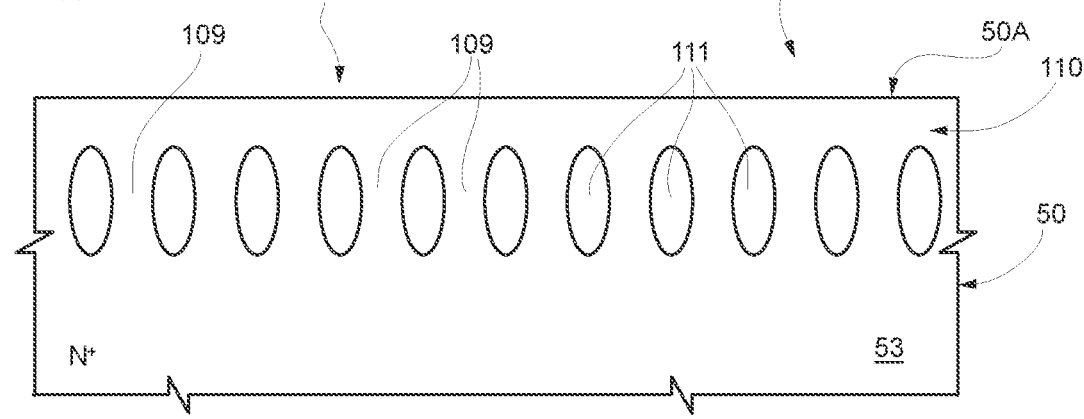
Figure 5:
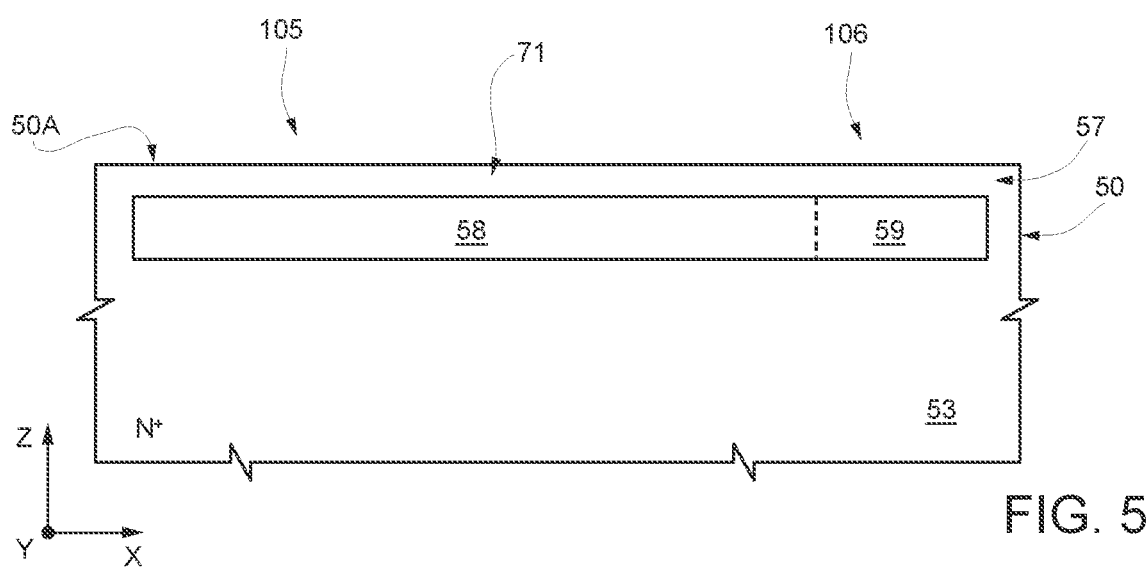

Subsequently, FIG. 4, the mask 104 is removed and an epitaxial growth is performed in a deoxidizing environment (typically, in an atmosphere with a high concentration of hydrogen, preferably with trichlorosilane—$SiHCl_3$). Consequently, a top layer 110 of monocrystalline silicon epitaxially grows in a controlled manner above the columns 109 and closes them at the top, trapping the gas in the deep trenches 108. Silicon may also grow inside the deep trenches 108 and causes a decrease in the height and width of the deep trenches 108. At the end of the epitaxial growth step, the deep trenches 108 form buried channels 111 having an oval section that is elongated in a direction perpendicular to the top surface (again indicated with 50A for simplicity) of wafer 1.

A thermal annealing is then performed, preferably in an atmosphere of hydrogen, for example for 30 minutes at 1190° C., or, alternatively, of a combination of hydrogen and another inert gas. As discussed in the aforementioned patent applications, the annealing step causes a migration of the silicon atoms, which tend to move to a position of lower surface energy, through adjacent lattice positions and preserving intact the perfect crystal-lattice structure of silicon.

In particular, FIGS. 5, 6, 7A and 7B, due to the close distance between the first columns 109 and their reduced width, the buried channels 111 inside the first doped region 53 of the wafer 50 merge completely and therefore form a single buried cavity 58 having a connection channel 59 projecting therefrom.

In particular, the buried cavity 58 and the connection channel 59 have a shape corresponding to the diaphragm area 105 and the connection area 106 of the mask portions 104A of FIG. 3 and are arranged in fluidic connection, seamlessly.

Figure 6:
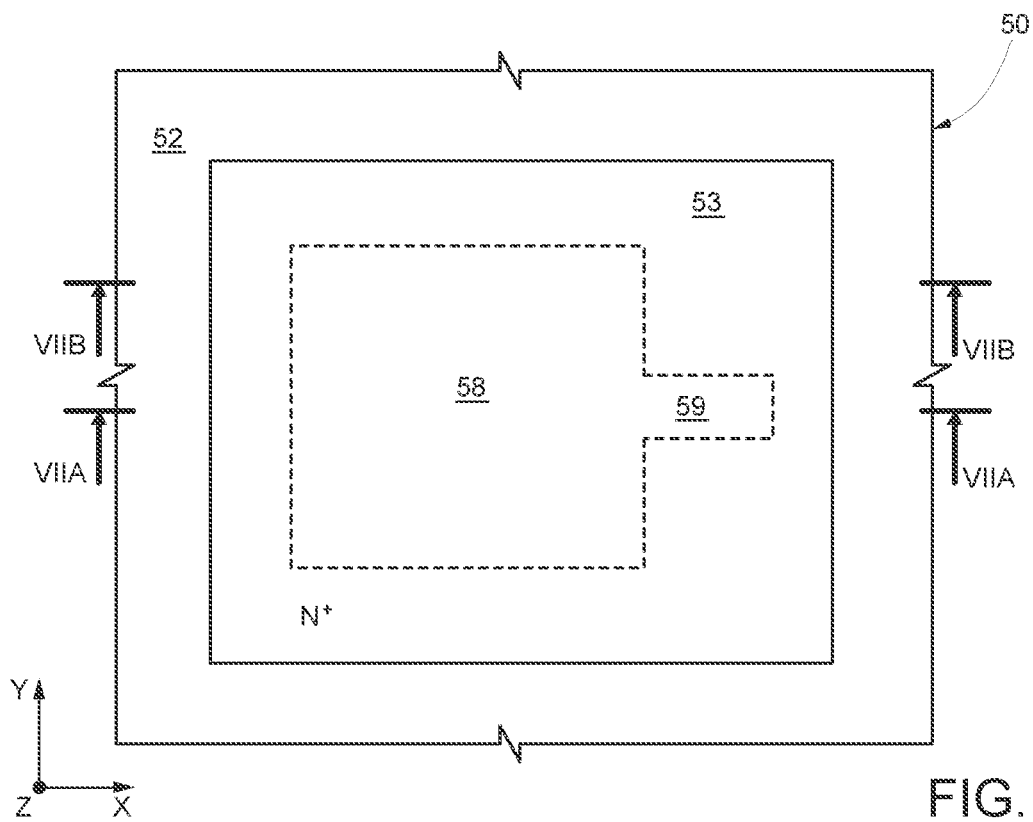
FIG. 6 is a top view, with parts in ghost, shown with dashed lines, of the wafer of FIG. 2, in the step of FIG. 5.

For example, FIG. 6, the buried cavity 58 has, in top view, a square shape and the connection channel 59 projects on one side from the buried cavity 58. Alternatively, the buried cavity 58 may have a rectangular, polygonal, circular or oval or whatever shape, depending on the intended application.

Figure 7A:
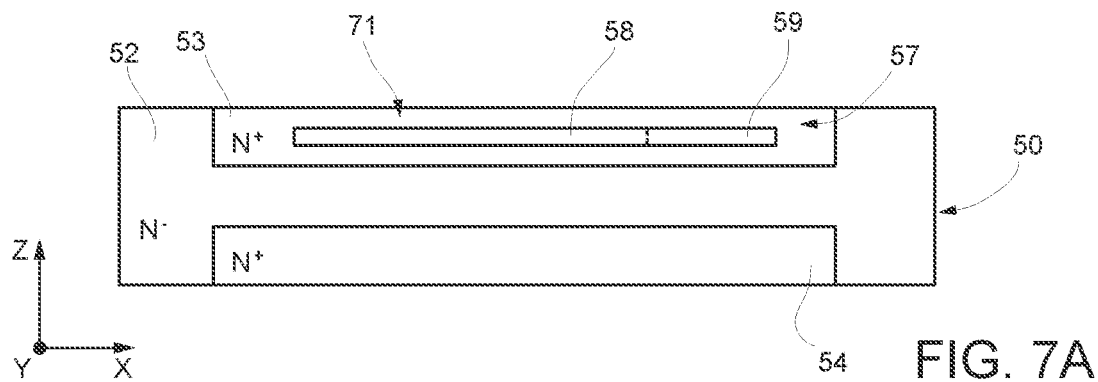
FIG. 7A is a cross-section view of the wafer of FIG. 6, taken along section line VIIA-VIIA of FIG. 6.
Figure 7B:
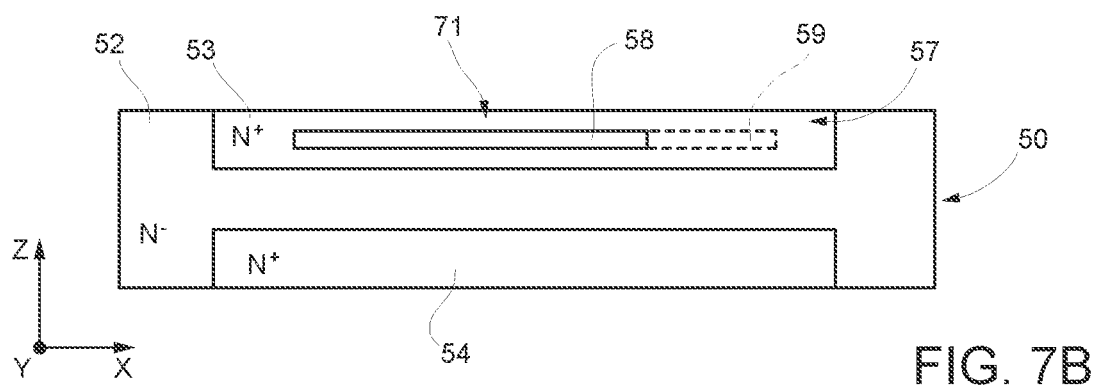
FIG. 7B is a cross-section view of the wafer of FIG. 6, taken along section line VIIB-VIIB of FIG. 6.

In FIG. 7A, which shows the section of the wafer 50 in a median plan of the buried cavity 58 (section plane VIIA-VIIA in FIG. 6, parallel to the plane XY), the buried cavity 58 and the connection channel 59 are therefore both visible and arranged in continuation to each other (similarly to what is visible in FIG. 5); in FIG. 7B, which shows the section of the wafer 50 in a plan parallel to, but distant from, the median plan (section plane VIIB-VIIB in FIG. 6), the connection channel 59 is not visible and is shown dashed only for illustrative reasons.

In the embodiment shown, the buried cavity 58 may have for example a side (along axes X and Y) equal to 500 µm and a depth (along axis Z) of about 3-5, for example 4 µm.

The connection channel 59 may have a length, along axis X, of about 30-40 µm and a width (along axis Y) of 5-10 µm.

A thin silicon layer (hereinafter referred to as epitaxial layer 57) remains above the buried cavity 58, has for example a thickness of about 4-7 µm or even greater, depending on the applications, and is made in part by silicon epitaxially grown atoms (top layer 110) and in part by silicon atoms migrated from the columns 109. This silicon layer forms, above the buried cavity 58, a diaphragm 71 of monocrystalline silicon.

The diaphragm 71 is flexible, suspended above the buried cavity 58, and may deflect in presence of external stresses. On the contrary, the zone of the epitaxial layer 57 above the connection channel 59 is stiff, due to the reduced width (along axis X).

Figure 8A:
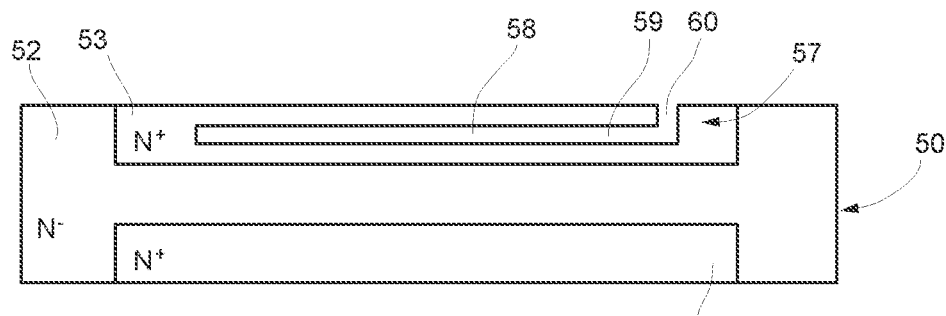
FIGS. 8A and 8B show cross-sections similar to FIGS. 7A and 7B, respectively, in a subsequent manufacturing step.
Figure 8B:
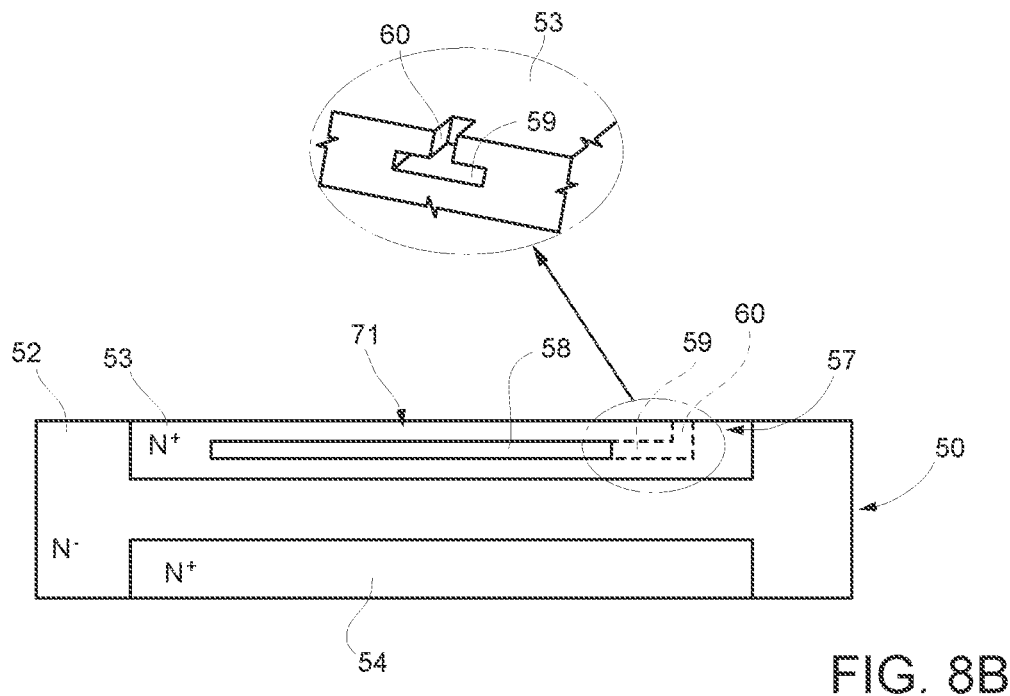

Subsequently, FIGS. 8A and 8B (taken along the same section planes as FIGS. 7A and 7B, respectively), an access trench 60 is formed from the top surface 50A of the wafer 50; the access trench 60 extends through the previously grown epitaxial layer 57 and reaches the connection channel 59.

Figure 9A:
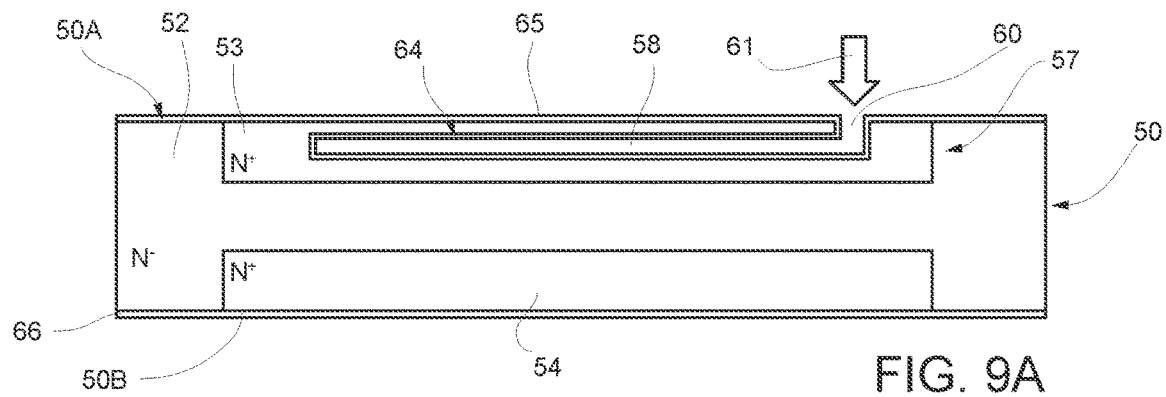
FIGS. 9A and 9B show cross-sections similar to FIGS. 8A and 8B, respectively, in a subsequent manufacturing step.
Figure 9B:
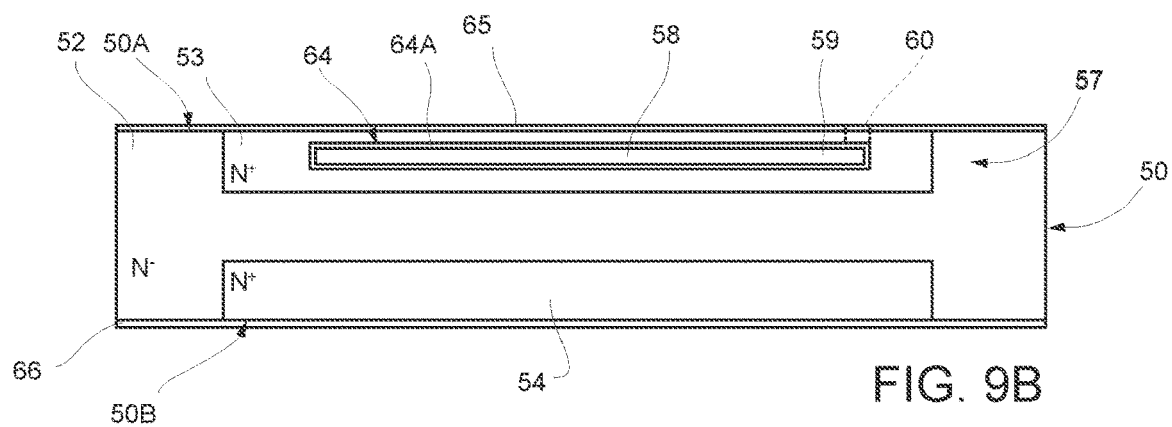

A thermal oxidation step is then performed, FIGS. 9A, 9B. In this step, oxygen or other oxidizing gas is fed to the wafer 50 and penetrates, through the access trench 60 and the connection channel 59, into the buried cavity 58, as indicated by the arrow 61 in FIG. 9A. A buried insulating layer 64 is thus formed on the walls of the buried cavity 58, the connection channel 59 and the access trench 60. In particular, a diaphragm insulating portion 64A is formed in the buried cavity 58 below the diaphragm 71.

The buried insulating layer 64 has a thickness allowing it to have load-bearing capacity, as described below, and has a thickness, for example, comprised between 1 and 2 µm.

Furthermore, a first surface insulation layer 65 is formed on the first surface 50A of the wafer 50.

In this step, a second surface insulation layer 66 is also formed on the second surface 50B of the wafer 50.

Figure 10:
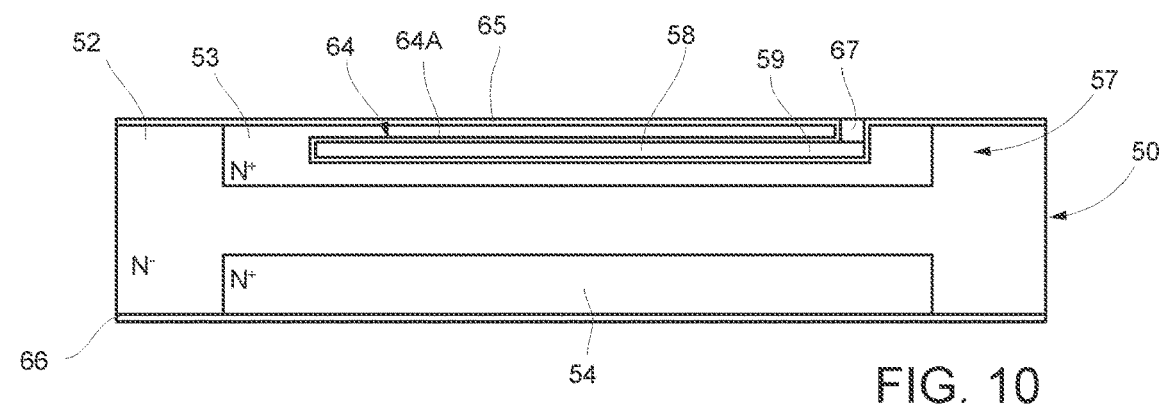
FIGS. 10-14 show cross-sections similar to FIG. 9B, in subsequent manufacturing steps.

Subsequently, FIG. 10, the access trench 60 is closed by a plug region 67 which extends for at least the top portion of the access trench 60. For example, the plug region 67 is obtained by depositing polycrystalline silicon and removing the surface parts by etch back. The deposition may be performed through an LPCVD ("Low-Pressure Chemical Vapor Deposition") process. Alternatively, another material, such as TEOS (Tetraethyl OrthoSilicate), may be deposited.

Figure 11:
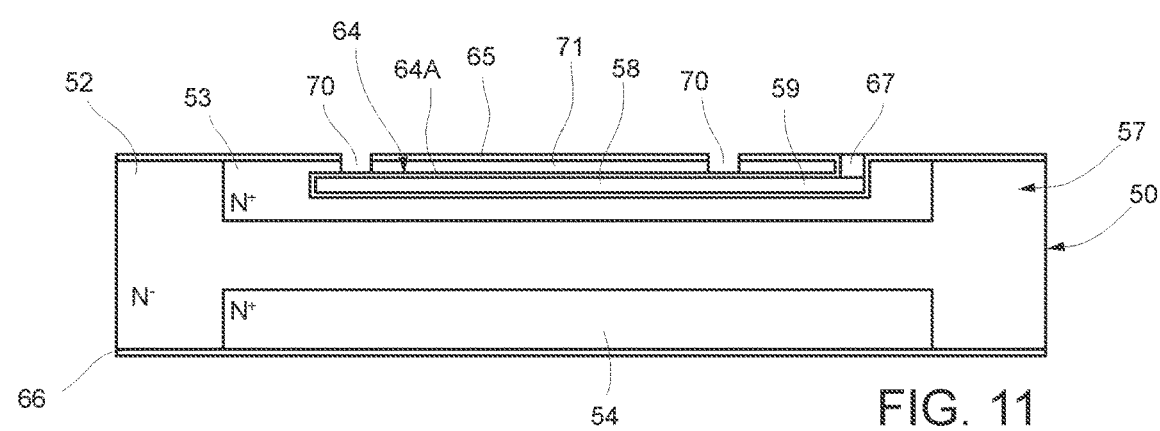

In FIG. 11, an insulating trench 70 is formed, using usual photolithographic trenching techniques. The insulating trench 70 extends above the buried cavity 58 and extends throughout the epitaxial layer 57, up to the diaphragm insulating portion 64A of the buried insulating layer 64. In particular, the insulating trench 70 extends along a closed line, for example square, and has a smaller area than the diaphragm 71, so as to separate the diaphragm 71 from the rest of the epitaxial layer 57.

In this step, therefore, the diaphragm 71 is supported by the diaphragm insulating portion 64A.

Figure 12:
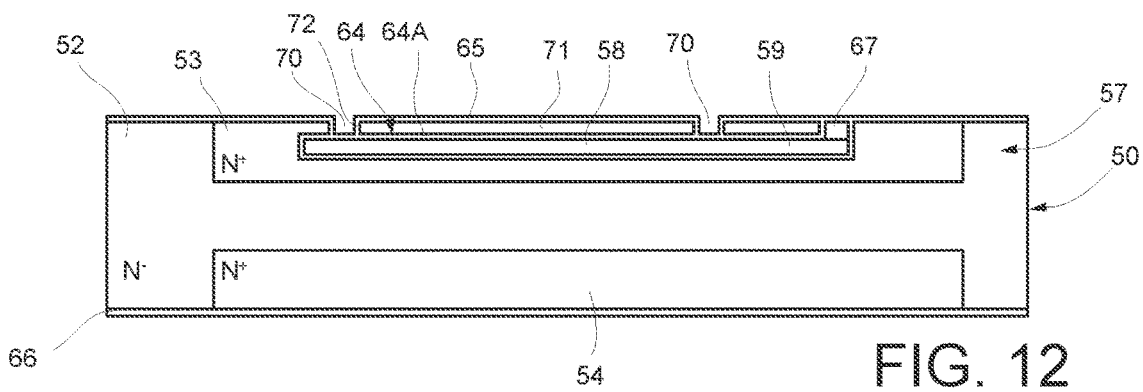

Subsequently, FIG. 12, a new thermal oxidation step is performed and the walls of the insulating trench 70 oxidize. Consequently, a lateral insulating layer 72, which joins the buried insulating layer 64 and forms a single layer therewith, is formed on the walls of the insulating trench 70.

Alternatively, an insulating layer, for example of silicon oxide or other dielectric material, may be deposited.

Figure 13:
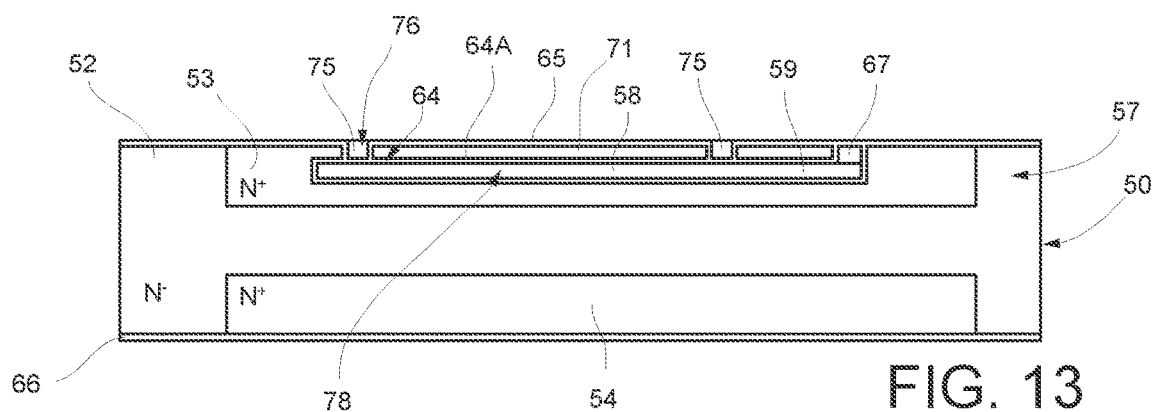

Then, FIG. 13, the insulating trench 70 is completely filled with trench filling material 75. For example, TEOS may be deposited by LPCVD (Low Pressure Chemical Vapor Deposition); alternatively, another insulator and/or another deposition technique may be used. The trench filling material 75 and the lateral insulating layer 72 form a lateral diaphragm insulating region 76, which laterally surrounds the diaphragm 71 and electrically insulates it from the rest of the epitaxial layer 57.

The lateral diaphragm insulating region 76 is therefore contiguous, in contact with the diaphragm insulating portion 64A and forms therewith a diaphragm insulating region 78 that is "tub-shaped." In practice, the diaphragm insulating region 78 surrounds the diaphragm 71 at the bottom and laterally and electrically insulates it from the rest of the wafer 50.

Figure 14:
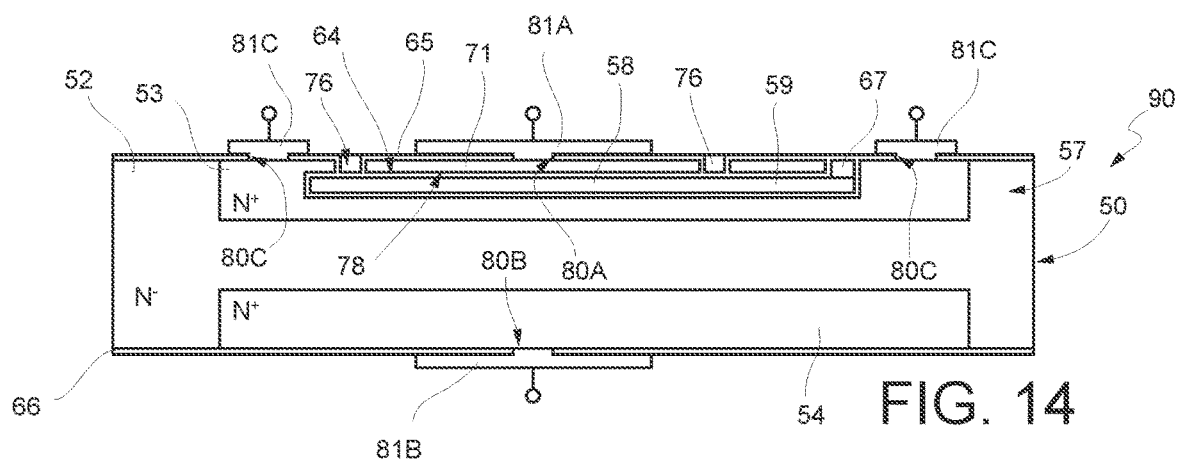

Then, FIG. 14, metallizations are formed. In particular, in a per se known manner, the first surface insulation layer 65 and the second surface insulation layer 66 are etched to form through openings 80A-80C and contacts 81A-81C are formed.

In detail, a first through opening 80A is formed in the first surface insulation layer 65, in the center of the diaphragm 71; a second through opening 80B is formed in the second surface insulation layer 66, above the second doped region 54; and third through openings 80C may be formed in the first surface insulation layer 65, at the first doped region 53, but outside the diaphragm 71.

A first contact 81A is formed on the first surface insulation layer 65, at the first through opening 80A, so as to be in direct electrical contact with the diaphragm 71.

A second contact 81B is formed on the second surface insulation layer 66, at the second through opening 80B, so as to be in direct electrical contact with the second doped region 54.

Third contacts 81C may be formed on the first surface insulation layer 65, at the third through openings 80C, so as to be in direct electrical contact with the first doped region 53.

After dicing the wafer 50, a MEMS device 90, here a capacitive pressure sensor, is obtained.

The MEMS device 90 is therefore formed in a monolithic body (wafer 50), made by a single semiconductor region, without bonded regions and accommodating a buried cavity. The buried cavity is completely surrounded by an insulating layer (buried insulating layer 64) which is directly joined to an annular insulating region (lateral diaphragm insulating region 76) extending above the buried cavity, between the insulating layer and the surface of the monolithic body.

The diaphragm is therefore completely and surely surrounded by an insulating region extending along a closed line and therebelow, without interruptions or critical portions.

The top surface of the substrate 52 is covered by a dielectric layer.

Figure 15:
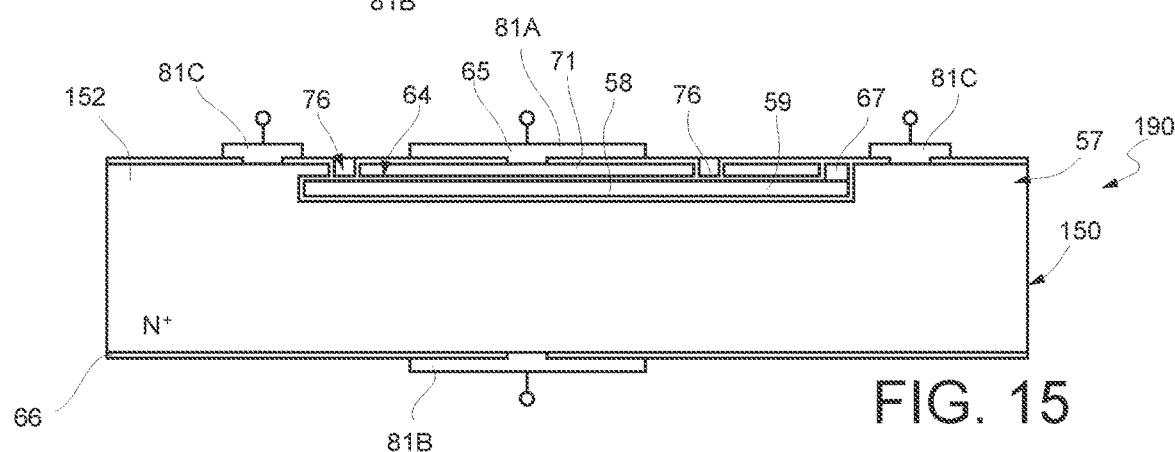
FIG. 15 shows a cross-section, similar to FIG. 14, of a different embodiment of the present MEMS device.

According to a different embodiment, shown in FIG. 15, the wafer (indicated with 150) comprises a substrate 152 of N⁺-type (for example, with conductivity of the order of 1 mΩ/cm). In this case, the first and the second doped regions 53, 54 are not formed, but, for the rest, the manufacturing process is the same described above with reference to FIGS. 6-14.

The MEMS device of FIG. 15, indicated with 190, has substantially the same structure as the MEMS device 90. Consequently, parts corresponding to those of the MEMS device 90 of FIG. 14 have been indicated with the same reference numbers.

The MEMS device 90 thus formed has an insulation without critical zones, which ensures complete electrical insulation, and therefore is reliable, may be produced with high yield and has reduced costs.

Furthermore, the MEMS device thus formed is compact, has a simple structure that is thus little subject to failure.

The manufacturing process comprises well-known and controlled manufacturing steps and therefore may be manufactured in a reliable manner.

Finally, it is clear that modifications and variations may be made to the MEMS device and to the manufacturing process described and illustrated herein without thereby departing from the scope of the present disclosure, as defined in the attached claims.

For example, the shape of the buried cavity 58 and therefore of the diaphragm 71 may be any.

The filling material of the access trench 60 as well as that of the insulating trench 70 may be any, even if an insulating material is preferable for the insulating trench 70, to effectively contribute to the electrical insulation.

A MEMS device may be summarized as including a semiconductor body (50; 150), the body being monolithic and having a first and a second main surface (50A, 50B); a buried cavity (58) in the semiconductor body; a diaphragm (71) extending between the buried cavity (58) and the first main surface (50A) of the semiconductor body (50; 150), the diaphragm (71) having a buried face facing the buried cavity (58); a diaphragm insulating layer (64A) extending on the buried face of the diaphragm; and a lateral insulating region (76), including insulating material, extending into the semiconductor body (50; 150) along a closed line, between the first main surface (50A) and the diaphragm insulating layer (64A), above the buried cavity (58), the lateral insulating region (76) laterally delimiting the diaphragm (71) and being in contact with the diaphragm insulating layer (64A).

The semiconductor body (50; 150) may be of silicon and the diaphragm insulating layer (64A) may be of silicon oxide.

The semiconductor body (50; 150) may be of monocrystalline silicon.

The first face (50A) of the semiconductor body (50; 150) may be covered by a silicon oxide layer (65).

The MEMS device may further include forming a capacitive pressure sensor and having a first and a second electrode (81A, 81B); the first electrode (81A) extending on the first main surface (50A) of the semiconductor body (50; 150), in physical and electrical contact with the diaphragm (71), and the second electrode (81B) extending on the second main surface (50B) of the semiconductor body, in physical and electrical contact with the semiconductor body.

The MEMS device according to any of the preceding claims, may further include a connection channel (59) extending from the buried cavity (58), in fluidic connection thereto, below the first main surface (50A) of the semiconductor body (50; 150), and an access trench (60) extending between the first main surface of the semiconductor body and the connection channel (59), outside the lateral insulating region (76), and filled with access closing material.

The semiconductor body (50) may include a substrate (52) having a conductivity type and a first doping level; a first conductive region (53) extending into the semiconductor body from the first main surface (50A) and having the conductivity type and a second doping level, higher than the first doping level; and a second conductive region (54) extending into the semiconductor body (50) from the second main surface (50B) and having the conductivity type and a third doping level, higher than the first doping level, wherein the first conductive region (53) accommodates the diaphragm (71) and extends on the buried cavity (58).

A process for manufacturing a MEMS device may be summarized as including in a semiconductor body (50; 150) having a first and a second main surface (50A, 50B), forming a buried cavity (58) extending at a distance from the first main surface of the semiconductor body, the buried cavity delimiting a portion of the semiconductor body extending between the same buried cavity and the first main surface (50A) and forming a diaphragm (71), the diaphragm having a buried face facing the buried cavity; forming a diaphragm insulating layer (64A), of a first insulating material, on the buried face of the diaphragm; and forming, in the semiconductor body, a lateral insulating region (76) including a second insulating material, the lateral insulating region extending along a closed line, between the first main surface of the semiconductor body and the diaphragm insulating layer (64A), above the buried cavity (58), and laterally delimiting the diaphragm (71).

Forming a buried cavity may include in a wafer having a front face (50A), forming first buried channels (111) delimiting columnar separation structures (109) of semiconductor material from each other; and performing a thermal annealing causing a migration of the semiconductor material of the separation structures (109) to the front face (50A), removal of the separation structures (109), and transformation of the buried channels (111) into the buried cavity (58).

Forming a buried cavity may further include performing an epitaxial growth on the front face (50A) of the monolithic body to form a closing layer (57, 110) of semiconductor material, the closing layer forming the first main surface of the wafer.

The process may further include forming, simultaneously with the buried cavity (58), a connection channel (59) extending laterally from the buried cavity and vertically offset with respect to the diaphragm (71), wherein forming a diaphragm insulating layer (64A) may include forming an access trench (60) extending from the first main surface (50A) of the wafer up to the connection channel (59); introducing an oxidizing gas through the access trench (60) and the connection channel (59), to form an insulating coating (64) surrounding the access trench, the connection channel (59) and the buried cavity (58), the insulating coating may include the diaphragm insulating layer (64A); and closing the access trench (60) with access closing material (67).

Closing the access trench may include depositing polycrystalline silicon or dielectric material such as TEOS.

Forming a lateral insulating region (76) may include forming an insulating trench (70) extending from the first main surface (50A) of the wafer (50) to the insulating layer (64A) and filling the insulating trench.

Filling the insulating trench (70) may include providing an oxidizing gas to the insulating trench; oxidizing walls of the insulating trench; and filling the insulating trench with dielectric material (75) such as TEOS.

The process according may further include forming a first electrode (81A) on the first main surface (50A) of the wafer, in physical and electrical contact with the diaphragm (71); and forming a second electrode (81B) on the second main surface (50B) of the wafer, in physical and electrical contact with the wafer, thus forming a capacitive pressure sensor (90; 190).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
a monolithic semiconductor body, the semiconductor body including:
a first main face;
a second main face opposite to the first main face;
a substrate including a conductivity type; and
a first conductive region extending into the substrate from the first main face, the first conductive region having the conductivity type;
a buried cavity in the first conductive region;
a diaphragm extending between the buried cavity and the first main face of the semiconductor body, the diaphragm having a buried face facing the buried cavity;
a diaphragm insulating layer extending on the buried face of the diaphragm; and
a lateral insulating region of insulating material, extending into the semiconductor body along a closed line, between the first main face and the diaphragm insulating layer, above the buried cavity, the lateral insulating region laterally delimiting the diaphragm and being in contact with the diaphragm insulating layer, and wherein:
the substrate having a first doping level;
the first conductive region having a second doping level higher than the first doping level, the first conductive region accommodates the diaphragm and extends along the buried cavity; and
the semiconductor body further includes a second conductive region extending into the substrate from the second main face, having the conductivity type, and having a third doping level higher than the first doping level.

2. The device according to claim 1, wherein the semiconductor body is of silicon and the diaphragm insulating layer is of silicon oxide.

3. The device according to claim 1, wherein the semiconductor body is of monocrystalline silicon.

4. The device according to claim 1, wherein the first main face of the semiconductor body is covered by a silicon oxide layer.

5. The device according to claim 1, further comprising:
a first electrode extending on the first main face of the semiconductor body, the first electrode is in physical and electrical contact with the diaphragm; and
a second electrode extending on the second main face of the semiconductor body, the second electrode is in physical and electrical contact with the semiconductor body.

6. The device according to claim 1, further comprising:
a connection channel extending from the buried cavity, in fluidic connection thereto, below the first main face of the semiconductor body, and
an access trench extending between the first main face of the semiconductor body and the connection channel, outside the lateral insulating region, and filled with access closing material.

7. A device, comprising:
a semiconductor body including:
a first main face; and
a second main face opposite to the first main face;
a substrate including a conductivity type; and
a first conductive region extending into the substrate from the first main face, the first conductive region having the conductivity type;
an access trench extending into the first main face of the semiconductor body;
a plug region fills the access trench and closes off the access trench;
a buried cavity is within the semiconductor body, the buried cavity is fully enclosed and is within the semiconductor body; and
a diaphragm overlaps the buried cavity and is between the first main face and the buried cavity, the diaphragm having a buried face facing the buried cavity, and wherein:
the substrate having a first doping level;
the first conductive region having a second doping level higher than the first doping level, the first conductive region accommodates the diaphragm and extends along the buried cavity; and
the semiconductor body further includes a second conductive region extending into the substrate from the second main face, having the conductivity type, and having a third doping level higher than the first doping level.

8. The device of claim 7, further comprising:
a first electrode on the first main face, the first electrode overlaps the diaphragm; and
a second electrode on the second main face, the second electrode overlaps the diaphragm.

9. The device of claim 8, wherein the first electrode is on the diaphragm.

10. The device of claim 7, further comprising a third electrode on the first main face, the third electrode is spaced apart from the diaphragm.

11. The device of claim 7, further comprising a buried insulating layer that lines the buried cavity.

12. A device, comprising:
a substrate including a first main face and a second main face opposite to the first main face and one or more conductive regions between the first main face and the second main face, the substrate has a conductivity type, and the conductive type is an N-type, and the one or more conductive regions includes:
a first conductive region at the first main face having a N+ type doping;
a second conductive region at the second main face having the N+ type doping; and
a third conductive region extending from the first conductive region to the second conductive region, the third conductive region having an N-type doping;

a buried cavity in a respective conductive region of the one or more conductive regions of the substrate;

a diaphragm extending between the buried cavity and the first main face of the substrate, the diaphragm having a buried face facing the buried cavity;

a diaphragm insulating layer extending on the buried face of the diaphragm; and a lateral insulating region of insulating material, extending into the substrate along a closed line, between the first main face and the diaphragm insulating layer, above the buried cavity, the lateral insulating region laterally delimiting the diaphragm and being in contact with the diaphragm insulating layer.

13. The device of claim 12, wherein the third conductive region of the substrate extends from the first main face to the second main face of the substrate.

14. The device of claim 12, wherein the respective conductive region of the one or more conductive regions is the first conductive region.

15. The device of claim 12, further comprising:
a first electrode on the first main face, the first electrode is on the diaphragm;
a second electrode on the second main face, the second electrode overlaps the diaphragm; and
a third electrode on the first main face, the third electrode is spaced apart from the diaphragm.

16. The device of claim 12, wherein the one or more conductive regions of the substrate is a conductive region having a N+ type doping, and the conductive region extends from the first main face to the second main face, and the respective conductive region of the one or more conductive regions is the conductive region.

17. The device of claim 15, wherein the first electrode and the second electrode are aligned with each other, and the first electrode overlaps the second electrode.

18. The device of claim 12, further comprising:
a first electrode on the first main face, the first electrode is on the diaphragm; and
a second electrode on the first main face, the second electrode is spaced apart from the diaphragm.

19. The device of claim 12, further comprising a first electrode on the first main face, the first electrode is on the diaphragm.

20. The device of claim 19, wherein the first electrode is in physical and electrical contact with the diaphragm.

\* \* \* \* \*